US006543053B1

(12) United States Patent
Li et al.

(10) Patent No.: US 6,543,053 B1
(45) Date of Patent: Apr. 1, 2003

(54) INTERACTIVE VIDEO-ON-DEMAND SYSTEM

(75) Inventors: Victor O. K. Li, Pokfulam (HK); Wanjiun Liao, Tainan (TW)

(73) Assignee: University of Hong Kong, Hong Kong (HK)

(*) Notice: Subject to any disclaimer, the term of this patent is extended or adjusted under 35 U.S.C. 154(b) by 0 days.

(21) Appl. No.: 08/995,043

(22) Filed: Nov. 20, 1997

Related U.S. Application Data
(60) Provisional application No. 60/033,345, filed on Nov. 27, 1996.

(51) Int. Cl.[7] ............................................. H04N 7/173
(52) U.S. Cl. .......................... 725/88; 725/87; 725/45; 725/97; 725/98; 709/217; 709/219
(58) Field of Search ............................. 725/87, 88, 95, 725/98, 101, 102, 90, 97; 709/217, 219

(56) References Cited
U.S. PATENT DOCUMENTS

| | | | | |
|---|---|---|---|---|
| 5,410,343 A | * | 4/1995 | Coddington et al. | 348/7 |
| 5,414,455 A | | 5/1995 | Hooper et al. | 348/7 |
| 5,442,389 A | | 8/1995 | Blauhut et al. | 348/7 |
| 5,442,390 A | | 8/1995 | Hooper et al. | 348/7 |
| 5,453,779 A | * | 9/1995 | Dan et al. | 348/7 |
| 5,461,415 A | * | 10/1995 | Wolf et al. | 348/7 |
| 5,606,359 A | * | 2/1997 | Youden et al. | 348/7 |
| 5,629,732 A | | 5/1997 | Moscowitz et al. | 348/7 |
| 5,631,694 A | * | 5/1997 | Aggarwal et al. | 348/7 |

OTHER PUBLICATIONS

Wanjiun Liao and Victor O.K. Li, 1997, IEEE, 11b.3.1–11b.3.8, pp. 1349–1356.*
Kevin C. Almeroth and Mostafa H. Ammar, Aug. 1996, IEEE, vol. 14, No. 6, pp. 1110–1122.*
Victor O. K. Li, Wanjiun Liao, Xiaoxin Qiu, and Eric W. M. Wong, Aug. 1996, IEEE, vol. 14, No. 6, pp. 1099–1109.*

* cited by examiner

*Primary Examiner*—Andrew Faile
*Assistant Examiner*—Ngoc Vu
(74) *Attorney, Agent, or Firm*—Fish & Richardson P.C.

(57) ABSTRACT

A data distribution system and a protocol for interactive information services over a network and in particular for video-on-demand applications. A shared buffer and a split-and-merge protocol are implemented to allow multiple users to share the same video stream multicasted over a network with true VOD services including the ability to access any available video at any time, and to perform any VCR-like functions and random access. Video requests for a video program are served in batches. A user interaction is first handled by splitting off the interactive user from a shared video stream in a batch, and by subsequently assigning the user a new dedicated video stream. The interactive user is subsequently merged back to one of the batching video streams shared by multiple users upon resuming normal play mode.

29 Claims, 13 Drawing Sheets

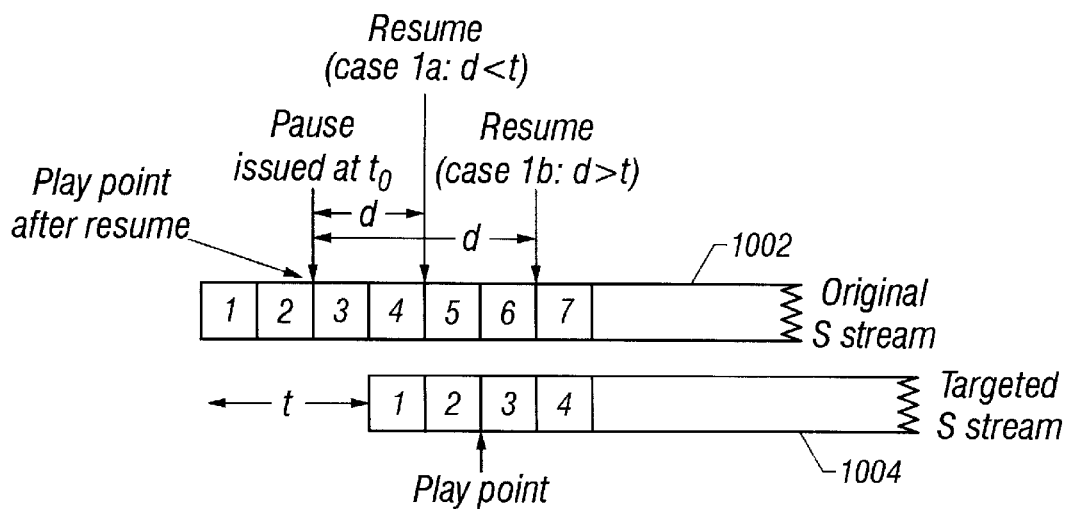
FIG. 10A
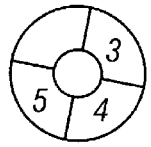
(a) Case 1: $t<SB$    Case 1a       Case 1b
                     FIG. 10B      FIG. 10C
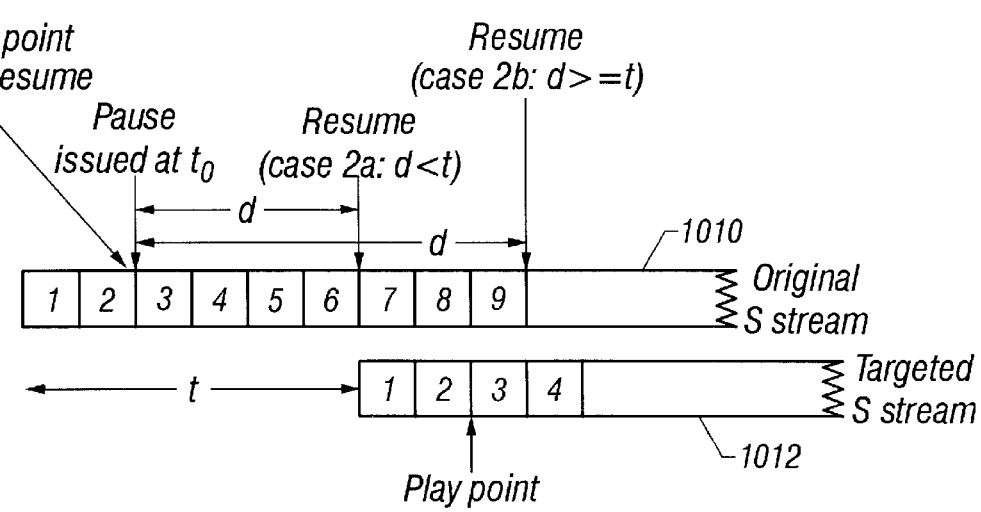
FIG. 10D
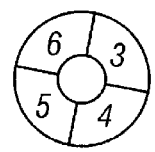
(b) Case 2: $t>SB$    Case 2a       Case 2b
                     FIG. 10E      FIG. 10F

(a) Case 1: $t <= SB'$  Case 1a

Case 2b

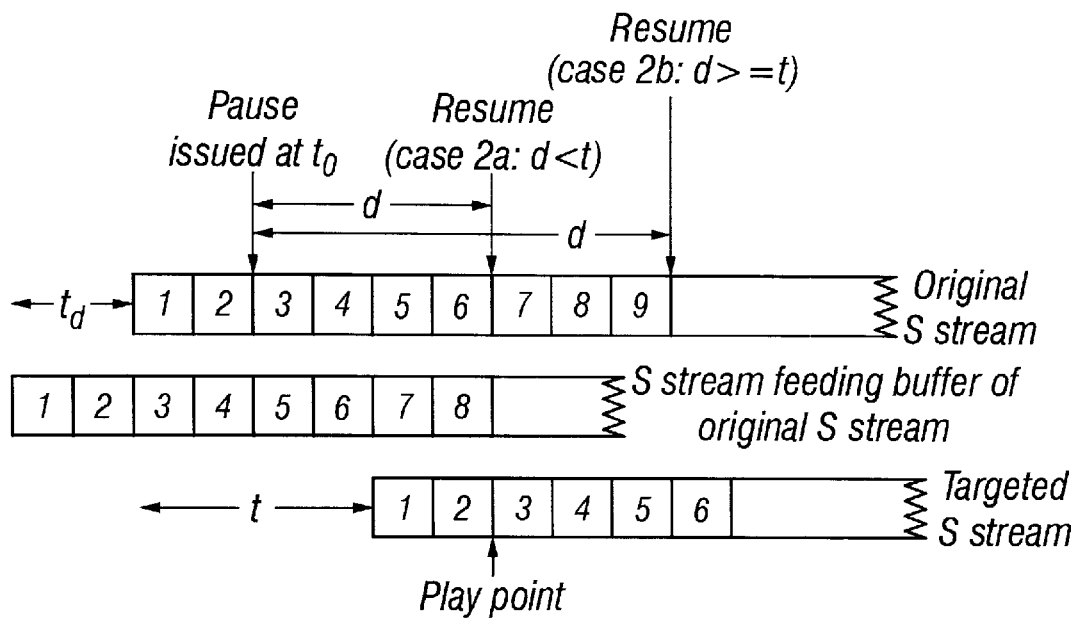
FIG. 11D
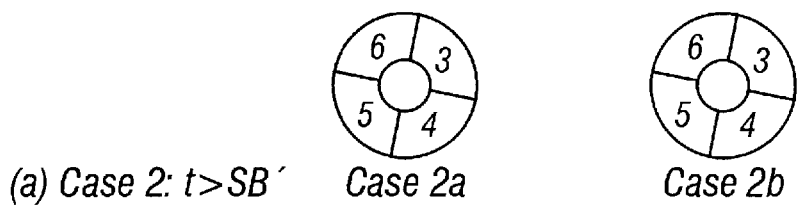
(a) Case 2: $t > SB'$   Case 2a   Case 2b
FIG. 11E   FIG. 11F

INTERACTIVE VIDEO-ON-DEMAND SYSTEM

RELATED APPLICATION

This application claims the benefit of the U.S. Provisional Application No. 60/033,345, filed on Nov. 27, 1996, which is incorporated herein by reference.

FIELD OF THE INVENTION

The present invention relates to information transmission, retrieval, reception, and distribution over a network, and more specifically, to a system and protocol for interactive multimedia services in a broadband network.

BACKGROUND OF THE INVENTION

A Video-on-Demand ("VOD") system combines a video display system such as a user's TV set or personal computer with information retrieval technology. This technology usually provides a specific electronic video service based on user's requests over a network. Applications of VOD include entertainment services such as movie-on-demand service, news-on-demand service, and remote learning.

In true VOD, a user is allowed to select any program from remote content archives at any time. Those archives can include audio and video materials, and multimedia titles. In addition, the user is allowed to interact at any time with the programs using operations including random access to any point in a program, fast-forward, rewind, pause/resume, slow-motion play, and other VCR-like controls.

A VOD system that does not meet all these requirements is called a near VOD system. Near-VOD is often used in order to conserve or more efficiently use system resources. True VOD service is more desirable in order to compete with existing video rental services.

FIG. 1A shows a generic VOD system 100. Multiple users 120 are served by networked servers 102 and 107 over a network 103. The solid lines represent the data flow for video and other data. The dashed lines represent the communication signal flow for controls and requests. Arrows indicate the flow direction.

The information sources of the system 100 are the networked remote server 102 connected to a backbone network 104 and the local server 107 in an access node 106. Servers 102 and 107 can include one or multiple servers that have massive storage devices and media controllers for storing a large number of databases including videos, multimedia titles, interactive games and others. Servers 102 and 107 are capable of serving a considerable number of simultaneous user requests to the same or to different programs on demand.

One or more electronic controllers 130 are deployed in the network 103 to control and monitor the operations of the VOD system 100. A controller may be a computer that controls the networked servers to operate under an operation protocol. The basic functions supported by the controller include request handling, support of user interactions, admission control and quality-of-service guarantees.

Storage media for servers 102 and 107 usually include magnetic disks, optical disks, and magnetic tapes. Such media are usually organized hierarchically to increase cost-effectiveness. For example, the more popular programs are stored on random access media, such as magnetic disks, for fast access and expedited distribution. The less-popular programs are stored in devices with longer access latencies such as a tape drive, and retrieved as necessary to a disk drive for processing.

The backbone network 104 may include high-speed switches and transport protocols which connect remote servers at geographically dispersed locations. One trend is towards a synchronous optical network ("SONET") backbone with asynchronous transfer mode ("ATM") switching because of their low error rate, high data transfer rate, capability of bandwidth-on-demand, and seamless services.

An access node 106 serves as a bridge between the backbone network 104 and access network 110. A plurality of such access nodes are deployed to link multiple access networks to the backbone network. Depending on the system implementation, the access node 106 may be a head-end in CATV networks, a central office in a telephone network, or a base station in mobile systems. The access node 106 may be equipped with satellite dishes to receive analog broadcast TV programs. Examples of access networks include a hybrid fiber coax ("HFC") system, asymmetric digital subscriber loop ("ADSL") system, fiber to the curb ("FTTC") system, wireless cable system, and direct broadcast satellite ("DBS") system.

A subscriber terminal unit or "set-top box" 120 in FIG. 1A forms an interface between the user and the VOD network. It receives, demodulates, and decodes the information. The user can interact with the VOD system by sending out control commands and service requests, typically through a remote control. The set-top box has interfaces to video/audio output devices (e.g., a computer, a TV or a telephone) and can be integrated as a part of the video/audio output device. A user can be connected to servers 102 and 107 with various user interfaces such as on-screen images and cursor-like devices.

Various VOD systems have been proposed and/or developed. Some have been tested in small-scale trials. A number of existing field trials of VOD systems are reviewed by T. S. Perry in "The Trials and Travails of Interactive TV," IEEE Spectrum, pp. 22–28, April, 1996.

One solution to provide true VOD services uses a dedicated video stream for each customer, i.e., the system resources associated with video delivery, namely, disk head usage and network bandwidth, are not shared. This is also referred to as a non-batching approach. Such systems usually are expensive since each stream requires high-speed video retrieval and transport, and can be inefficient because multiple identical video streams are sent to multiple customers accessing the same video. Existing VOD field trials typically deliver MPEG-1 or MPEG-2 compressed video, requiring 1.5 Mbps and 3 Mbps, respectively. Therefore, in the non-batching approach, the number of users which can be simultaneously served in a true VOD mode is limited by the system resources.

A batching approach can be used to increase the capacity or the number of simultaneous users of a given system. Batching divides users into groups. All users in the same group are served by the same video stream. One may group users according to their video request time.

FIGS. 1B and 1C show non-batching and batching approaches, respectively. In a non-batching approach as in FIG. 1B, each user has a designated video stream generated by a designated video disk head, and transmitted to the user using dedicated network resources. A video disk head is typically multiplexed among multiple video streams. Therefore, the designated disk head may only correspond to a fraction of a physical video disk head. True VOD can be implemented this way for a limited number of users at a high cost.

In a batching approach as illustrated in FIG. 1C, the same video stream 140 is multicasted to, and shared by, multiple users 120 accessing the same video. Sharing is implemented both at the disk head and in the network. Thus, usage of the system resource per user is reduced and thereby the system capacity is increased. Many video delivering systems have implemented such batching mechanisms with limited user interactivity.

U.S. Pat. No. 5,357,276 to Banker et al., discloses a staggered VOD. This system broadcasts multiple staggered-in-time copies (streams) of the same video program. Specifically, a copy of the same video program is broadcasted to a group of users in a batch in a fixed batching interval. A user is always being served by one of the streams. User interactions are simulated, where practical, by switching to different streams. However, not all user interactions can be simulated in this fashion. Fast forward, i.e., displaying the video at a rate higher than the normal playback rate, is one example of a user interaction which cannot be simulated since none of the broadcast streams is in a fast forward mode.

Several interactive functions can be simulated with this system including pause, jump forward/jump back operations. However, the interactive effects are limited by the staggering structure, specifically by the staggering interval thereof. For example, if the staggering interval is 5 minutes, a user may jump forward or backwards by intervals of 5 minutes, 10 minutes, 15 minutes, etc. However, the user cannot jump for 7 minutes, since no stream is offset in time by 7 minutes from the stream currently being viewed by the user.

In addition, the system disclosed in U.S. Pat. No. 5,357,276 has low utilization of the system resources. A video stream needs to be broadcasted in every fixed batch interval for the duration of a program in order to accommodate the limited interactive functions available in the system, independent of the number of requests in a particular batching interval. Thus, a generated video stream may not have a user at all.

U.S. Pat. No. 5,477,263 to O'Callaghan et al. also describes a similar staggering scheme to support a near VOD system.

U.S. Pat. No. 5,629,732 to Moskowitz and Rizkalla distinguishes between low demand (unpopular) and high demand (popular) videos. No sharing is allowed in delivering low demand videos, while a staggering scheme similar to U.S. Pat. No. 5,357,276 is used for high demand videos.

For high demand video, the whole video is stored in random access memory (RAM), and video streams are created with starting times staggered in time. A pointer is created to point to the present location of each such stream. User interactions are simulated by pointer hopping. This scheme suffers from the disadvantages, which we have described earlier, associated with staggering schemes. In addition, it requires much RAM since each popular video has to be stored completely in RAM.

U.S. Pat. No. 5,461,415 to Wolf et al. and U.S. Pat. No. 5,453,779 to Dan et al. disclose systems that implement a "look-ahead scheduling" scheme in combination with the concept of batching. Each user is assigned a "set-aside" buffer memory to hold a portion of the video. When a user in the batch pauses, the stream feeds the set-aside buffer. If the user resumes within the capacity of the set-aside buffer, the user video is reconstructed based on the storage in the buffer. The system also reserves resources for each user in the batch for situations where the pause is resumed after the capacity of the set-aside buffer has been exceeded. Such reserved resources may be in the form of on-going video streams which terminate within the capacity of the set-aside buffer (e.g., measured in duration of the video segment that can be stored) or in the form of new video streams. This system, however, only supports pause and resume operations and hence is not a true VOD system.

Ameroth and Ammar disclose a system with buffer memory in the set-top boxes to provide limited interactive functions in a near VOD service utilizing staggered streams in "The use of multicast delivery to provide a scalable and interactive video-on-demand service," IEEE Journal On Selected Areas in Communications, Vol 14, No. 6, pp. 1110–1122, August 1996.

Li et al. disclose a true VOD system in "Performance Model of Interactive Video-On-Demand Systems," IEEE Journal of Selected Areas in Communications, 14(6) :1099–1109, August, 1996. Multiple users share a video stream during normal play. User interactions are accommodated by creating a new stream for each interactive user. The user holds this newly-created stream until disconnection (e.g., the end of a program or the user quitting in the middle of the program). However, this system is most effective when a small number of users are expected to issue interactive operations. Initiation of more and more user interactions degrades the system to a non-sharing mode in which all merits of batching are essentially lost.

Hence, the prior art has demonstrated that sharing a video stream can increase the number of users that are simultaneously served by a given system. However, the majority of the prior-art systems have implemented sharing in a way that does not allow true user interactivity. The inventors recognize that it is desirable to have a true VOD system which allows sharing and true user interactivity. Such a system is described in this disclosure.

SUMMARY OF THE INVENTION

The inventors recognized that it is desirable to implement sharing of a video stream to increase the number of users that are simultaneously served by a given system. The inventors further recognized that sharing should be implemented in a way that allows true user interactivity.

It is one aspect of the invention to provide a mechanism to substantially increase or maximize the sharing of the video streams while supporting a full spectrum of user interactive operations in a video distribution system. A preferred system increases or optimizes the system resource utilization, increases or maximizes the number of simultaneous users, and allows truly interactive video services.

One embodiment of the true VOD system comprises: an information channel (e.g., a network) which transports digital data and communication signals; a plurality of data receivers (e.g., set-top boxes) connected to the information channel; at least one digital server, storing information and multicasting a plurality of data streams indicative of the stored information into the information channel; and an electronic controller connected to the information channel, operating to control the multicasting and to implement true VOD service.

In one preferred mode of operation, requests for a video may be initially served in batches, resulting in sharing a multicast video stream by multiple users in a batch. A split-and-merge (SAM) protocol based on batching is used to control the operations of a true VOD system of the invention. This protocol allows user interactions to be issued at any time during the transmission of a video program. An interactive user may be split off from the shared video stream, and temporarily assigned a dedicated video stream.

Since dedicated resources are available, any type of user interactions may be supported. After resuming normal play, the user is merged back into one of the on-going batched video streams of the same video program, and the temporarily-assigned video stream is released.

One feature of the invention includes using a synchronization buffer ("synch buffer") to synchronize two video streams which are offset in time. The synch buffer receives data from a video stream and temporarily stores the data. Subsequently, the synch buffer can be commanded to export the stored input video and thereby creates a new "virtual" video stream. That virtual video stream can have a time offset from the original input stream. The amount of possible offset is a function of the amount of the buffer memory used. The synch buffer may be used for directly implementing or assisting a user interaction. In so doing, the use of the synch buffer improves the efficiency of the batching approach.

A combination of the synch buffer and the split-and-merge protocol allows an increased or maximized sharing of the system resources and true user interactions.

One advantage of the invention is the full user interactivity. A user can select any program available in a remote content archives at any time and can interact with the program at any time. For example, the user can perform user interactions in a program such as random access to any point in a program, fast forward, rewind, pause and resume, slow motion play, fast play, and other controls (e.g., VCR-like functions).

Another advantage of the invention is efficient utilization of the system resources by sharing video streams using the split-and-merge protocol and the user synch buffer.

These and other aspects and advantages of the present invention will become more apparent in light of the following detailed description, the accompanying drawings, and the appended claims.

BRIEF DESCRIPTION OF THE DRAWINGS

FIGS. 10A, 10B, 10C, 10D, 10E, and 10F are schematics to show an example of the operation of pause/resume in the SAM technology for a user that is originally fed by an S stream.

FIGS. 11A, 11B, 11C, 11D, 11E, and 11F are schematics to show an example of the operation of pause/resume in the SAM technology for a user that is originally fed through a virtual stream generated by a synch buffer.

DETAILED DESCRIPTION OF THE INVENTION

The present disclosure describes a split-and merge ("SAM") technique to support full spectrum of user interactions in a true VOD system. The detailed description of the preferred embodiments will be specifically referred to as a video distribution system. It will be understood that the present invention is also applicable to other interactive information delivery systems. Accordingly, the term "video" or "video stream" herein will be construed in general as any kind of information in a certain sequence such as a video program, an audio program, or any multimedia information formed into a program.

Implementation of True VOD System

Figure 1A:
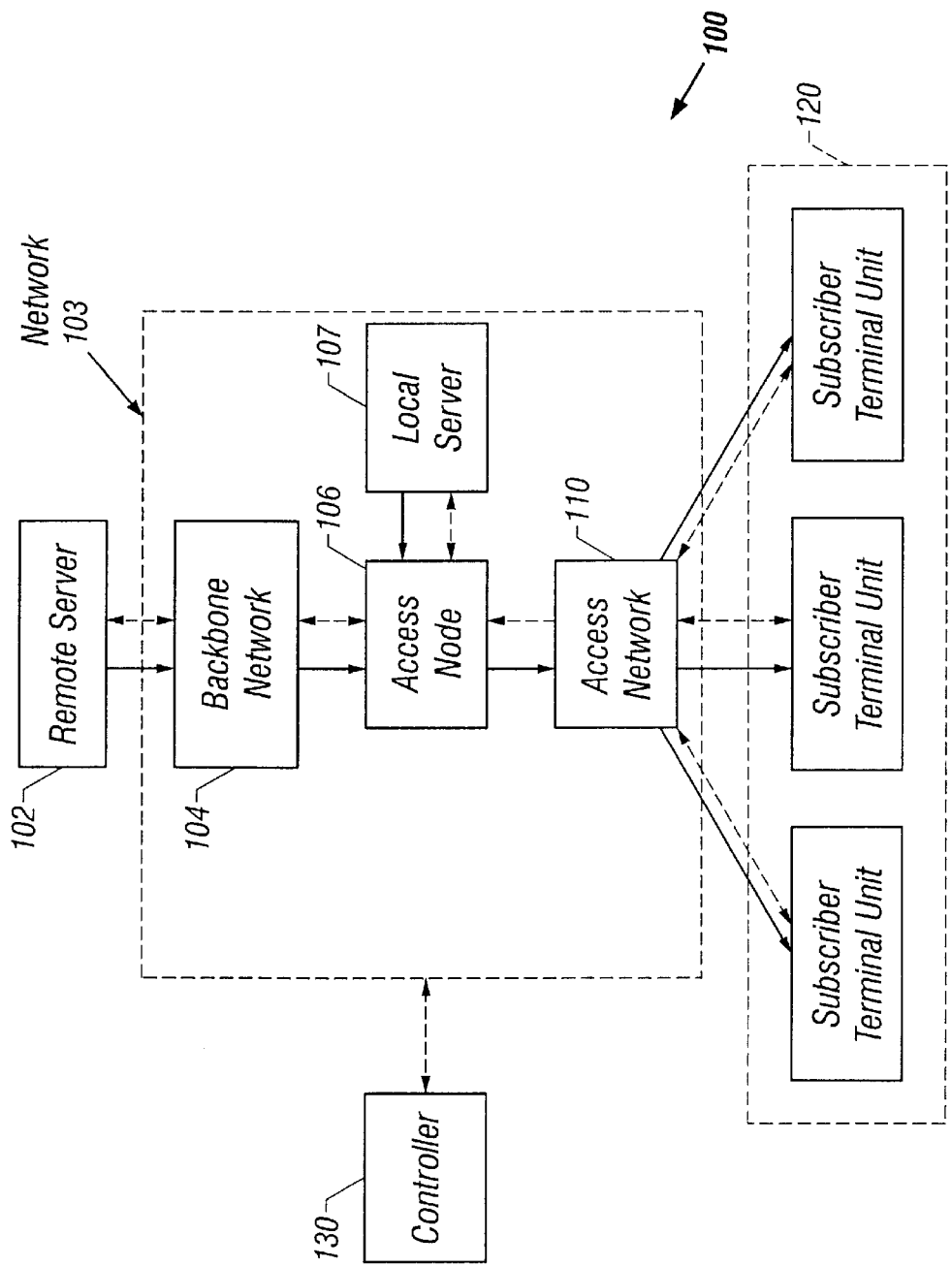
FIG. 1A is a block diagram showing a generic VOD system.
Figure 1C:
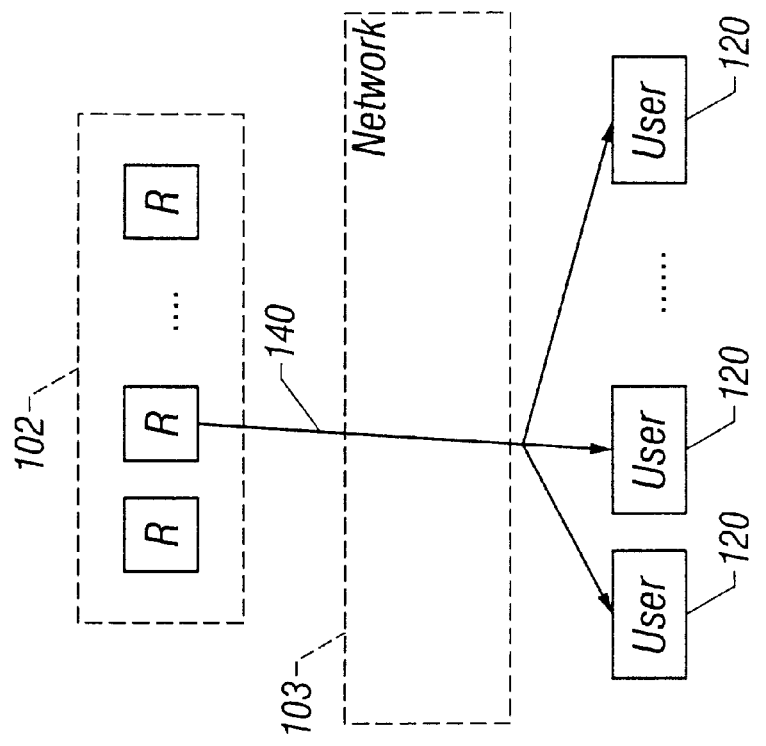
FIGS. 1B and 1C are block diagrams showing a batching approach in comparison with a non-batching approach.
Figure 1B:
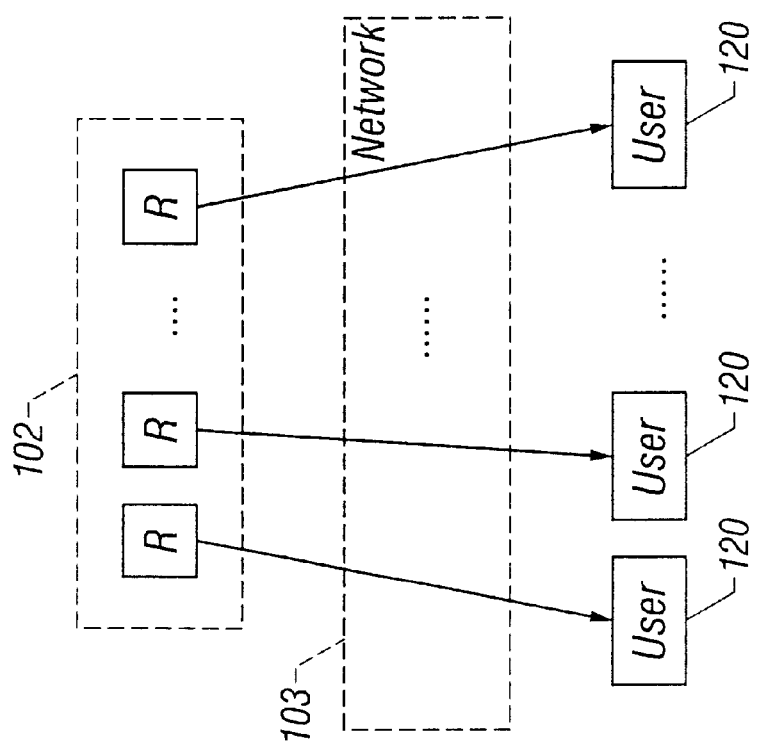
Figure 2:
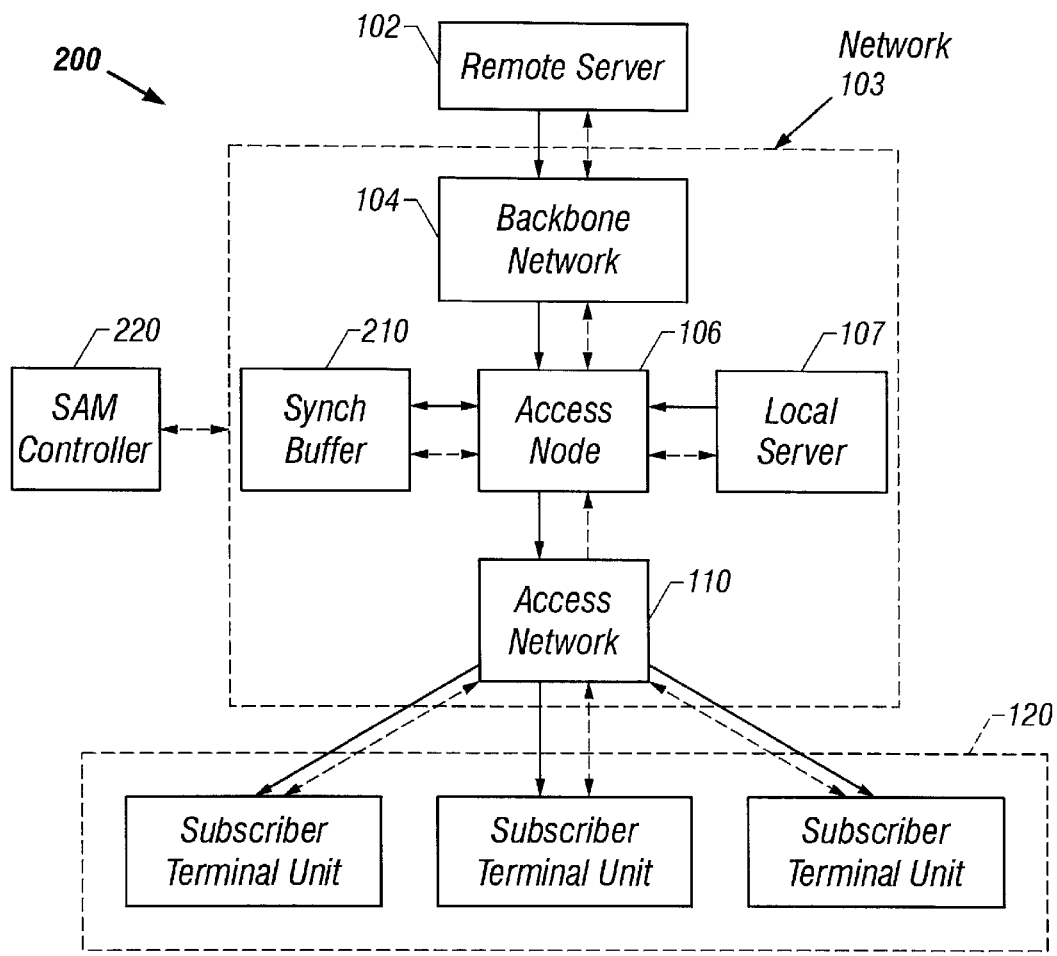
FIG. 2 is a block diagram showing one implementation of a synch buffer in a VOD system.

FIG. 2 shows a block diagram of a VOD system 200 of the present invention. One important aspect of the embodiment 200 is a shared memory referred to herein as a synchronization buffer 210 ("synch buffer"). The synch buffer 210 is a memory device of the dynamic RAM type. In general, the synch buffer 210 can be connected to the network at any location. One possible location of the synch buffer 210 is at the access node 106 as shown in FIG. 2. This choice of synch buffer location may be implemented in a system with a CATV or telephone network. The synch buffer may also be co-located with the video server in a local area network based system, or located at the set-top box in a Direct Broadcast Satellite System.

The synch buffer 210 is preferably shared by all users. The system preferably limits the amount of memory that can be used by any user. Each user may use up to a maximum amount, $M_{sb}$(bits)=SB×$R_p$, of the synch buffer, wherein SB (seconds) is the maximum time duration of a video stream which can be stored in the synch buffer for a user, and $R_p$ (bits/second) is the playback rate of the stream. SB will be frequently used herein to characterize the size of the synch buffer. The maximum size $M_{sb}$ may be so determined to satisfy desired user request blocking probability and user interaction delay. This maximum may be set equal for all users or may be adjusted to meet the operational requirements of a specific application or a particular user.

The synch buffer 210 may be accessed by any user at any time when needed or may be accessed by multiple users simultaneously. A user is usually assigned an allocated memory space up to $M_{sb}$ in the synch buffer 210 when the user requests an user interaction. As soon as the user finishes using this portion of the synch buffer 210, it is released and available to other users. This sharing results in an efficient use of the synch buffer.

The synch buffer 210 may be configured to have two operation ports, an input port for retrieving video from a video stream and an output port for exporting data. A real video stream is understood herein as video segments of a program that is retrieved by a read-write head from a networked video server (e.g. servers 102 and 107) and transported over the network 103 in digital form to the users 120. A virtual video stream, i.e., a video stream that is not directly generated by a read-write head from a networked server but rather derived from another on-going video stream, is sometimes needed to implement true VOD services in accordance with the present invention. A virtual video stream simulates a real video stream without using as much of the system resource as a real video stream. One of the functions of the synch buffer 210 is to create such virtual video streams.

For example, suppose a user issues an interaction of jump forward by seven minutes during a normal play from a video stream of a movie. The system 200 will attempt to create a virtual video stream to simulate the desired video stream by utilizing one of the ongoing video streams and the synch buffer 210.

Figure 3:
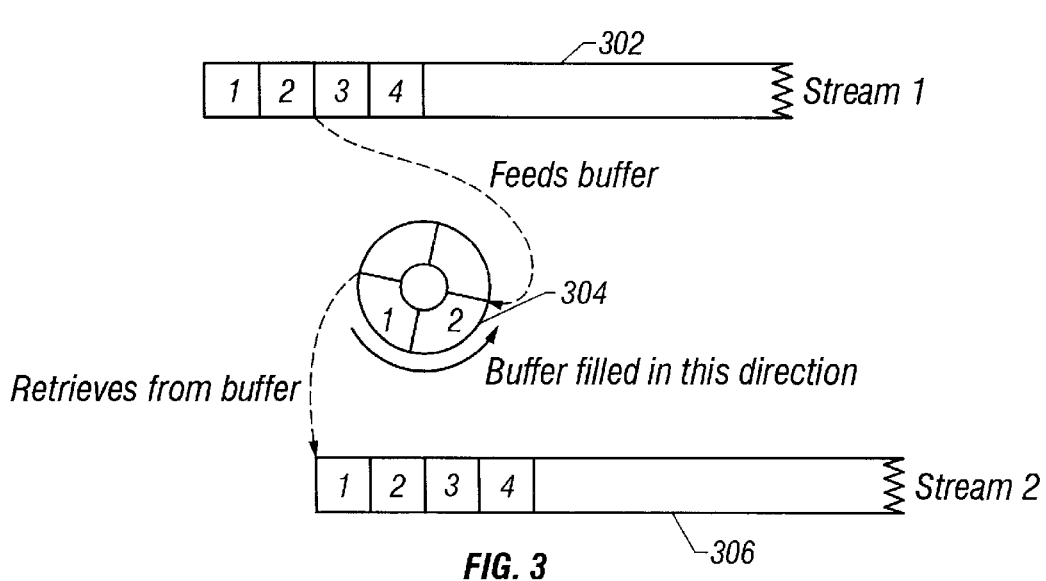
FIG. 3 is a schematic illustrating the operation of the synch buffer in accordance with the present invention.

FIG. 3 illustrates a preferred operation of a synch buffer in generating a virtual video stream. A video stream 302 is an on-going real video stream. The system 200 then uses this on-going video stream 302 to feed a portion of the synch buffer 210. A virtual stream 306 is created when data is retrieved from the synch buffer 210 after a time offset of two segments. Thus, the video stream 302 is two segments ahead of the newly-created virtual stream 306. A portion of the synch buffer 210 of size four segments, denoted 304, is being used by this user. FIG. 3 further shows the contents of a portion of the synch buffer 304 as stream 306 starts to retrieve the first segment from this portion of the synch buffer 210. Note that this portion of the synch buffer 304 will be full after stream 302 has fed it four segments and subsequent segments will then overwrite the previous segments, i.e. segment 5 will overwrite segment 1, segment 6 will overwrite segment 2, etc.

Another feature of the VOD system 200 is an electronic controller 220. One or more such controllers may be implemented. The controller 220 may include one or more CPUs with associated software that is either connected to the network 103 or integrated as a part of one or more components (e.g., networked servers) in the VOD system 200. In particular, the controller 220 is programmed to perform operations of a split-and-merge ("SAM") protocol which will be described in detail herein.

Variations of the Network

The embodiment 200 of FIG. 2 for a true VOD system may take other forms as well. The network configuration may be replaced by any other information channel such as a wireless communication channel using radio signals and other electromagnetic waves. Thus, a VOD system in accordance with the invention may include an electronic controller, one or more servers, and a synch buffer memory device, all connected by the information channel.

Split-and-Merge Protocol

The preferred embodiment 200 of the present invention is capable of providing true VOD services with an improved utilization of the system resources. One preferred operation mode of the system 200 is the split-and-merge (SAM) protocol which is described in detail. The SAM technology exploits batching to reduce the video delivery cost per user, or, from a different point of view, to increase the number of users that can be served with given system resources, while still providing true VOD services.

Since user interactions typically last a short time compared to normal play, the video streams are preferably divided into two categories with different designated purposes:

(1) Service stream (S stream): such a real video stream is used to serve the users during normal playback. This is typically a multicast stream and is shared by multiple users simultaneously.

(2) Interaction stream (I stream): such a real video stream is used to satisfy the requests for user interactions. An I stream is usually used by one user.

Note that S stream and I stream refer to the resources, namely, disk head usage, network bandwidth, etc., necessary to deliver video streams. Such resources may be used to deliver any of the videos in the system.

SAM can be used to accomplish true VOD services, while taking full advantage of batching. A number of users are initially batched and served by an S stream. Each of the batched users may initiate user interactions at any time during normal play. When a user interaction is admitted, this user will be split out of the original S stream, and temporarily allocated to an I stream to allow the desired interaction. Once the user interaction is complete, the user will be merged back to the nearest ongoing S stream. Such split-and-merge operations are repeated whenever a user interaction is initiated and until the original S stream terminates.

A new user request for a program in the VOD service may be blocked while all the S streams are occupied. Once the request has been admitted, however, any further user interactions will not be blocked, even if all system resources are busy. Interactive requests of an admitted user will be allowed to wait until the resource is available. During the waiting period, the user continues normal playback. The user is switched to the user interaction mode as soon as resources become available.

SAM is an adaptive protocol. As demand for a particular program increases, more S streams will be generated in the system for that program automatically. As demand wanes, fewer S streams will be generated. SAM works in any scenario and it works most efficiently for popular programs.

Figure 4:
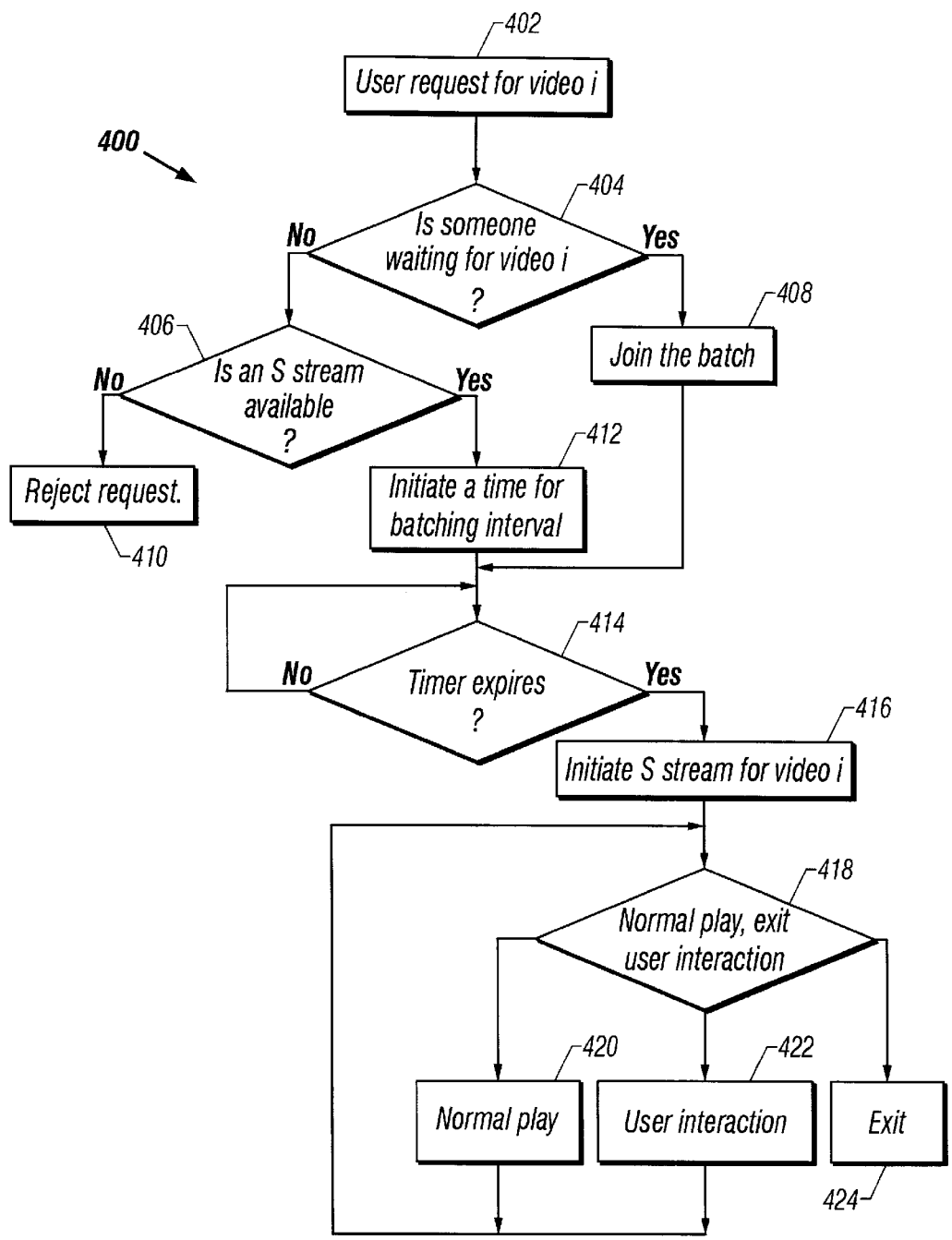
FIG. 4 is a flowchart for the preferred VOD protocol in accordance with the present invention.

A flowchart 400 showing a preferred SAM protocol for the system 200 of FIG. 2 is shown in FIG. 4. In general, a number of video programs are available in a networked server within the system 200. At step 402, a new request from a user for a video i arrives. If the request is the first request for video i (step 404), the system 200 then attempts to form a new batch for video i. The system requests an S stream from the pool of available S streams in the system (step 406). If no S stream is available, the request is blocked at step 410. The user may then try again later, or may just decide not to watch the video. If an S stream is available, it will be reserved. A batch timer is then initiated and a new batch is thus formed (step 412).

If there is already a batch being formed for video i, a new request joins the batch and the user waits until the batch timer expires (i.e., at the end of the batching interval). This is step 408.

When the batch timer expires, the reserved S stream will be initiated to serve this user and all other requests for video i which have arrived during the batching interval (steps 414 and 416).

After a user request is accepted at step 408 or step 412, the maximum waiting time is $W_i$. The actual value of $W_i$ is a system design parameter.

One unique feature of this embodiment of the SAM protocol is that each batch is initiated on demand rather than by periodic broadcasting as in the prior-art systems using staggered VOD. In addition, the batching interval $W_i$ may be adjusted according to the popularity of each video to further enhance the efficiency of sharing. Moreover, the initial batching delay may be avoided, as described in one of the variations later on in this disclosure.

A user admitted into the system may remain in normal playback to the end of the program (steps 418, 420, and 424) or may interact with the program at any time in the preferred system 200 of the present invention (step 422). The SAM protocol allows users to interact with any video programs via VCR-like functions including play, stop, pause, resume, fast-forward(FF), rewind(REW), slow motion, jump-forward, and jump-backward.

The following detailed descriptions explain how the SAM protocol and the system 200 work in combination to support the interactive operations.

1. Random Access: Jump Forward and Jump Backward

The random access operation allows a user to access any point in a program at any time. Jump forward and jump backward are two basic operations in random access of information. Such random access operations are not supported in the current generation of VCR/VTR machines but can be used to provide a desirable search mechanism for digital multimedia services. The preferred implementation of jump forward and jump backward in accordance with the present invention is shown in a flowchart 500 of FIG. 5. Operation of jump forward is described here below in detail. Operation of jump backward is carried out in a similar manner.

Figure 6:
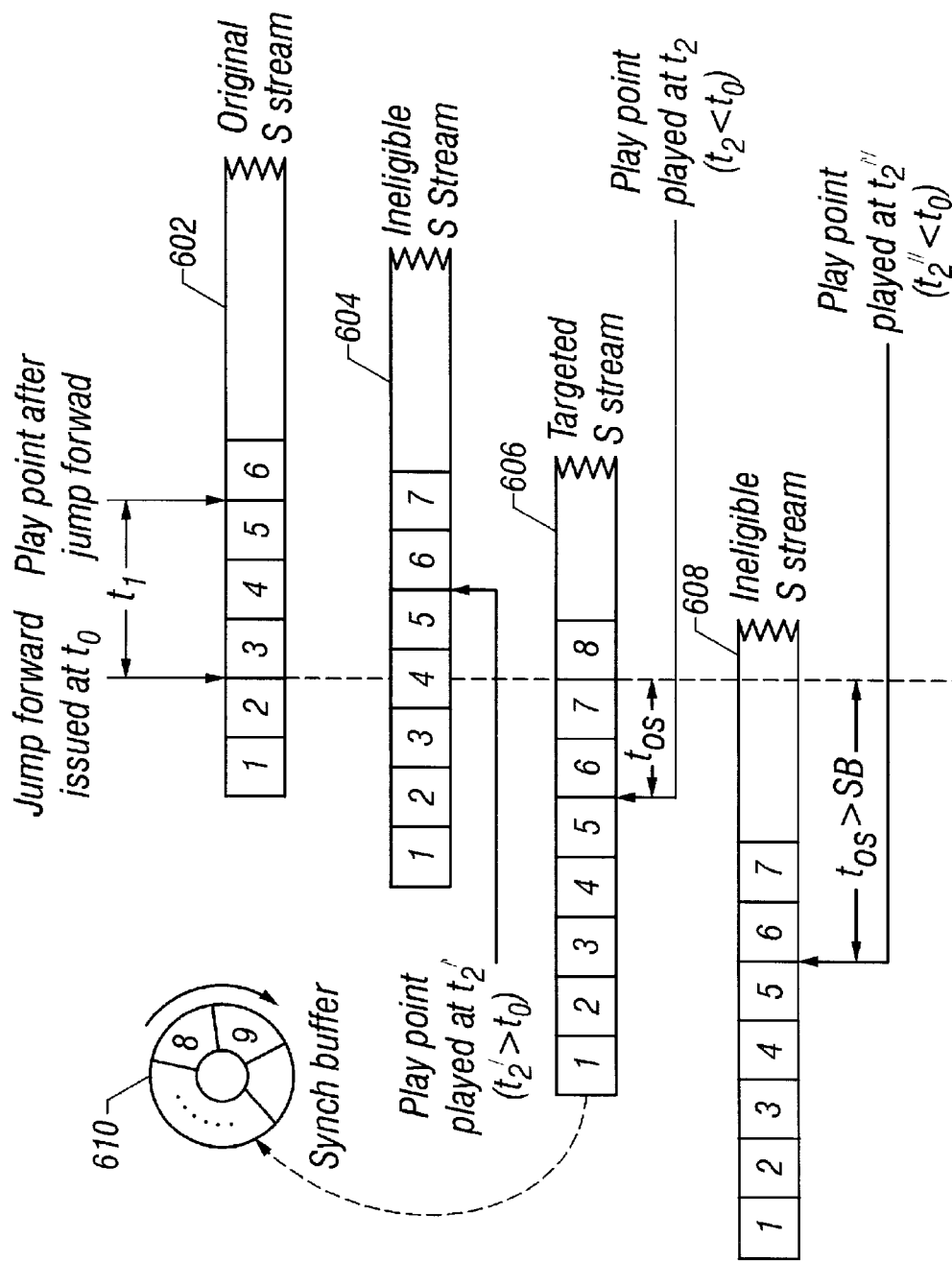
FIG. 6 is a schematic showing an example of the operation of jump forward in the SAM technology in accordance with the present invention.

Assume that a user accessing video i is being served by a video stream. The user issues a jump forward operation at time $t_o$ (step 502). Suppose the user jumps forward to a point in video i which is ahead of the point $t_o$ by a time interval $t_1$. If $t_1$ is so large that the jump forward would carry the user beyond the end of video i, the system 200 will jump the user to the end of video i. Otherwise, the system 200 will jump to the user to the play point, a location of video i at which the user will resume normal play after the user interaction. FIG. 6 shows an example of jumping forward from the beginning of segment 3 to the beginning of segment 6. The play point in this case is the beginning of segment 6. Note that to satisfy this jump forward operation, a stream of video i which plays the beginning of segment 6 at time $t_o$ is needed.

The system 200 searches all ongoing S streams for video i in an attempt to find an ongoing video stream which most closely matches the request. This is shown as step 504 in FIG. 5.

An S stream is eligible if its corresponding play point is played at a time prior to $t_o$, but still within SB of $t_o$.

Figure 5:
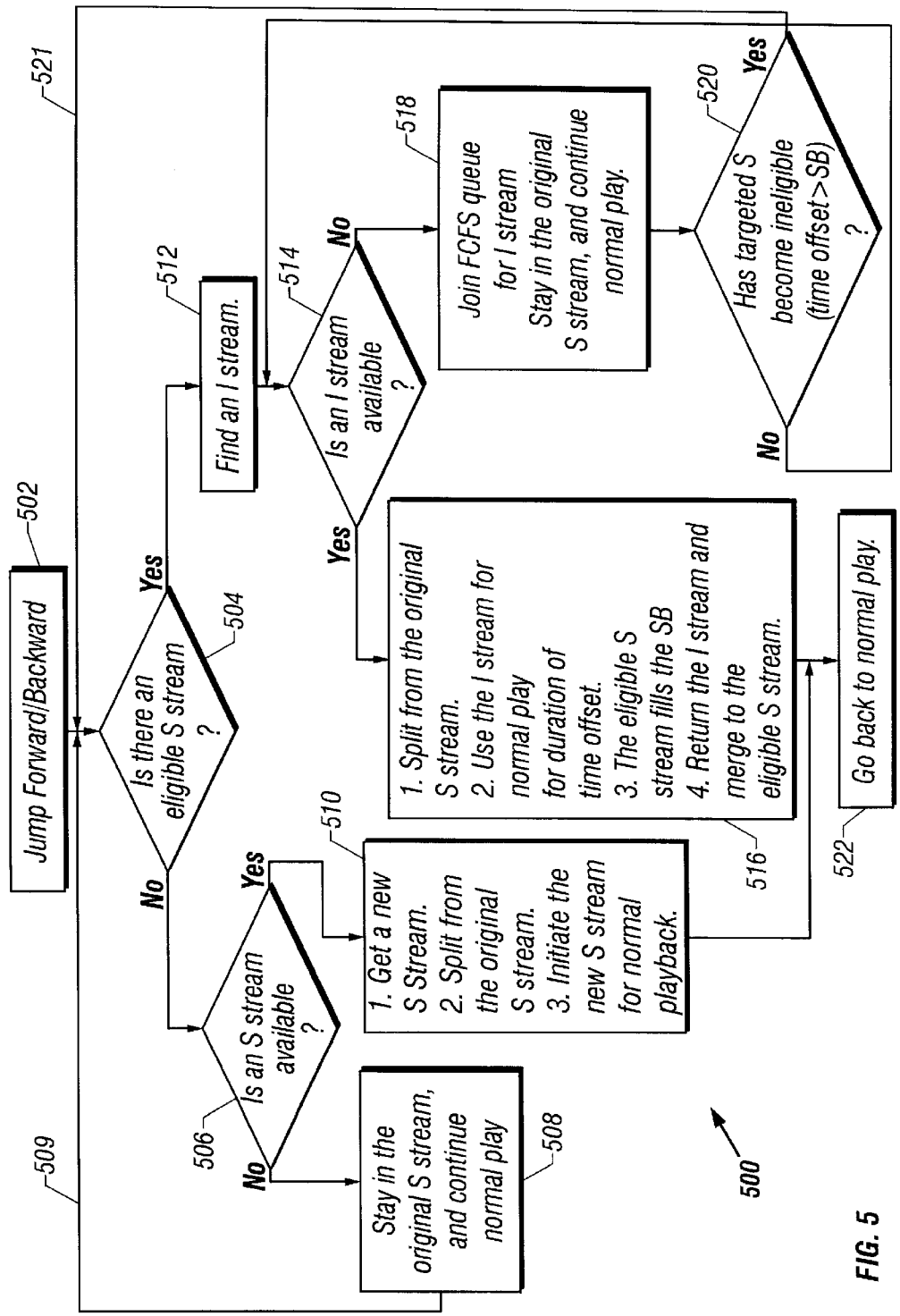
FIG. 5 is a flowchart showing the preferred operation of jump forward/backward in the SAM technology for a true VOD service in accordance with the present invention.

The concept of "eligible S stream" introduced in FIG. 5 can be explained with the example illustrated in FIG. 6. The example in FIG. 6 assumes that the user can use up to four segments of the synch buffer. There are several ongoing video streams of the same program that have time delays relative to one another.

The second S stream 604 is ineligible because it has not reached the play point yet. The last S stream 608 is ineligible because the time offset ($t_{os}$) between 608 and the desired stream is more than SB, the maximum synch buffer that the user is allowed to use.

The stream labeled "targeted S stream" 606 is eligible. If there are multiple eligible streams, the system 200 will preferably merge the user with the one having the smallest time offset in order to minimize the usage of the synch buffer. If $t_2$ is the time instant at which the play point in the targeted S stream 606 is played, the time offset $t_{os}$ is given by to $t_{os} = t_o - t_2$.

Once a targeted S stream has been identified, the SAM protocol will prompt the system 200 to find an I stream as indicated by step 512 in the flowchart 500. Such an I stream will be reserved for the user if available and the user will be split from the original S stream. The I stream will then be initiated for the delivery of video i to the user, starting at the play point. This is accomplished by steps 514 and 516.

After the user is split from the original stream, the I stream will be used for normal play for a duration equal to the time offset $t_{os}$, i.e., viewing segments 6 and 7 for the example in FIG. 6. In the meantime, a connection is maintained to the targeted S stream to feed the synch buffer. After the synch buffer has been fed for a period equal to $t_{os}$, corresponding to segments 8 and 9 in the example, the SAM protocol will serve the user with a virtual stream generated from the output of the synch buffer. The I stream is then released and available to serve another interactive request (steps 516 and 522). Thus, the user has successfully merged to a shared on-going S stream.

If an I stream is not available, the user's request will join a first-come-first-served queue as indicated by step 518. In the meantime, normal play continues from the original S stream 602. During the waiting period, the targeted eligible S stream may become ineligible, in which case the system 200 will search for another eligible S stream as indicated by the loop 521 in the flowchart 500.

If an eligible S stream is not available for the user to merge into, the SAM protocol will prompt the system 200 to initiate a new S stream to serve this user. This is indicated by steps 506 and 510 in the flowchart 500.

If there is no S stream available in the system, the user request will join a first-come-first-served queue for the next available S stream. In the meantime, normal play continues from the original S stream. This is indicated by step 508 and a loop 509.

The above-described process assumes that the user is fed by an S stream directly. Suppose the user is being served by the synch buffer fed by an S stream, i.e., the user has issued an interactive operation earlier, the operation of jump forward remains the same. The differences are (1) when the user waits for an I or S stream, the user continues normal play from the synch buffer; (2) after the user successfully merges with a targeted S stream, the connection to the original S stream through the synch buffer is terminated and the data stored in the buffer corresponding to the original S stream is discarded; and (3) if the jump forward is to a point in the video that is already stored in the synch buffer, the user can be directly served from the synch buffer without initiating the split-and-merge process.

The operation of jump backward is similar, except that the eligible S streams have negative offsets.

2. Fast Forward and Rewind

Figure 7:
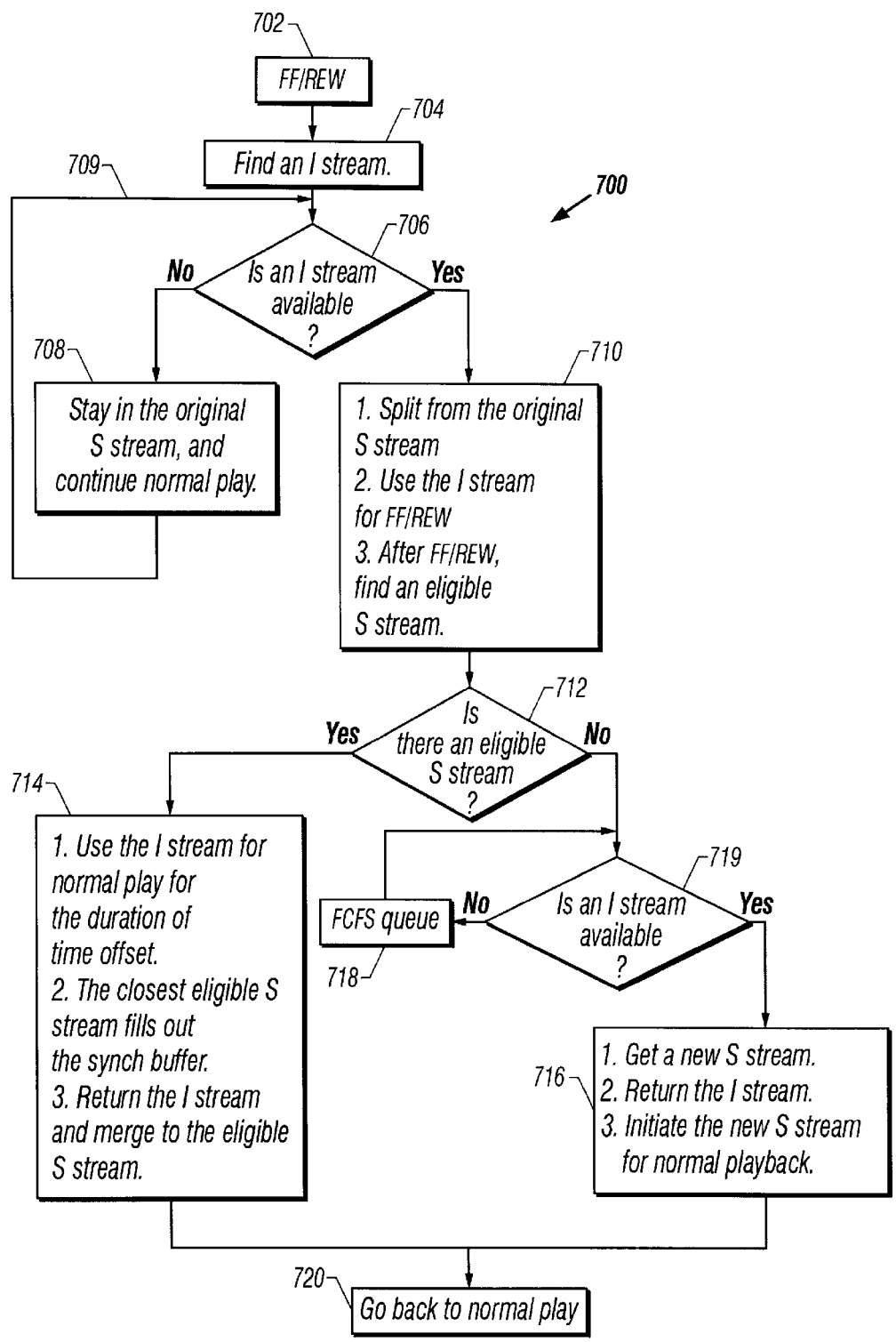
FIG. 7 is a flowchart for the preferred operation of fast forward and rewind in the SAM technology in accordance with the present invention.
Figure 8:
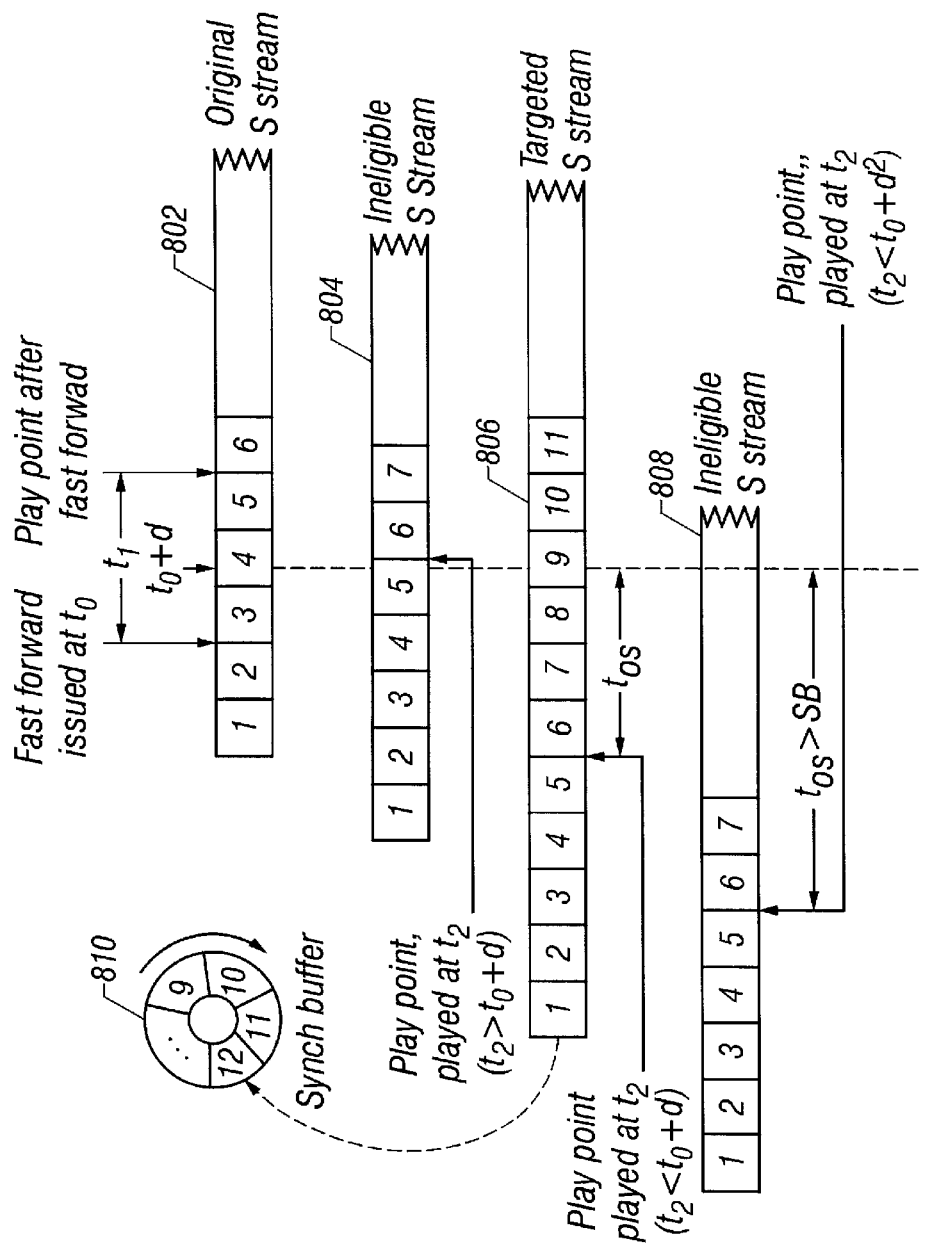
FIG. 8 is a schematic illustrating an example of the operation of fast forward in the SAM technology in accordance with the present invention.

The preferred embodiment for performing fast forward and rewind is shown in the flowchart in FIG. 7. FIG. 8 shows an example of how the SAM protocol handles fast forward to illustrate the operation of the SAM protocol shown in FIG. 7.

It is again assumed that a user is allocated a synch buffer up to a maximum size SB, which corresponds to four segments in the example of FIG. 8. The user is served video i by a stream 802 labeled "original S stream".

In step 702, the user issues a fast forward operation at time $t_o$. An I stream is requested by the SAM protocol to serve the user in step 704. If one is available, the SAM protocol prompts the system to split the user from the original S stream and to connect the user to the I stream. This is indicated by step 710 in FIG. 7. Video i is delivered to the user in fast forward mode by the I stream. Otherwise, the request for an I stream joins a first-come-first-served queue. In the meantime, the user continues normal play from the original S stream. This is indicated by step 708 and loop 709.

Suppose the user terminates the fast forward operation and resumes normal play after a duration d. The fast forward operation takes the user to a point $t_1$ time units beyond the initialization of the fast forward, i.e. to the beginning of segment 6 in FIG. 8. The SAM protocol attempts to disconnect the user from the I stream and merge the user back to one of the on-going S streams of video i. The SAM protocol searches all on-going S streams of video i for an eligible stream for this user (step 712).

An S stream is eligible if its corresponding play point (i.e., the beginning of segment 6 in the example of FIG. 8) is played at a time prior to $(t_o+d)$, but still within SB of $(t_o+d)$.

Thus the second and the last S streams 804 and 808 in FIG. 8 are ineligible. The targeted S stream 806 is eligible. If there is no eligible S stream, a new S stream is initiated to serve the user as indicated by step 716. If there is no available S stream in the system, the request joins a first-come-first-served queue for the first available S stream. In the meantime, the user continues normal play from the I stream (step 718).

If there is at least one eligible S stream for video i in the system, the SAM protocol merges the user with the eligible S stream whose offset $t_{os}=t_o+d-t_2$ is the smallest. This is indicated by step 714 in FIG. 7. The I stream held by the user continues to serve the user starting at the play point in normal play mode. In the meantime, the targeted S stream will feed the synch buffer. After the synch buffer has been fed for a period equal to $t_{os}$, corresponding to the second half of segment 9, segments 10 and 11, and the first half of the segment 12 in the example of FIG. 8, the user then merges into the targeted S stream and starts to retrieve video i from the synch buffer. The I stream is released and available for another request. Thus, the user has successfully merged into a shared on-going S stream.

As in the operation of jump forward, the operation of SAM remains substantially similar if the user is originally served by the synch buffer that is fed by an S stream.

The operation of rewind is similar to the fast forward operation described there above, except that the eligible S streams will have negative offsets.

3. Pause and Resume

Figure 9A:
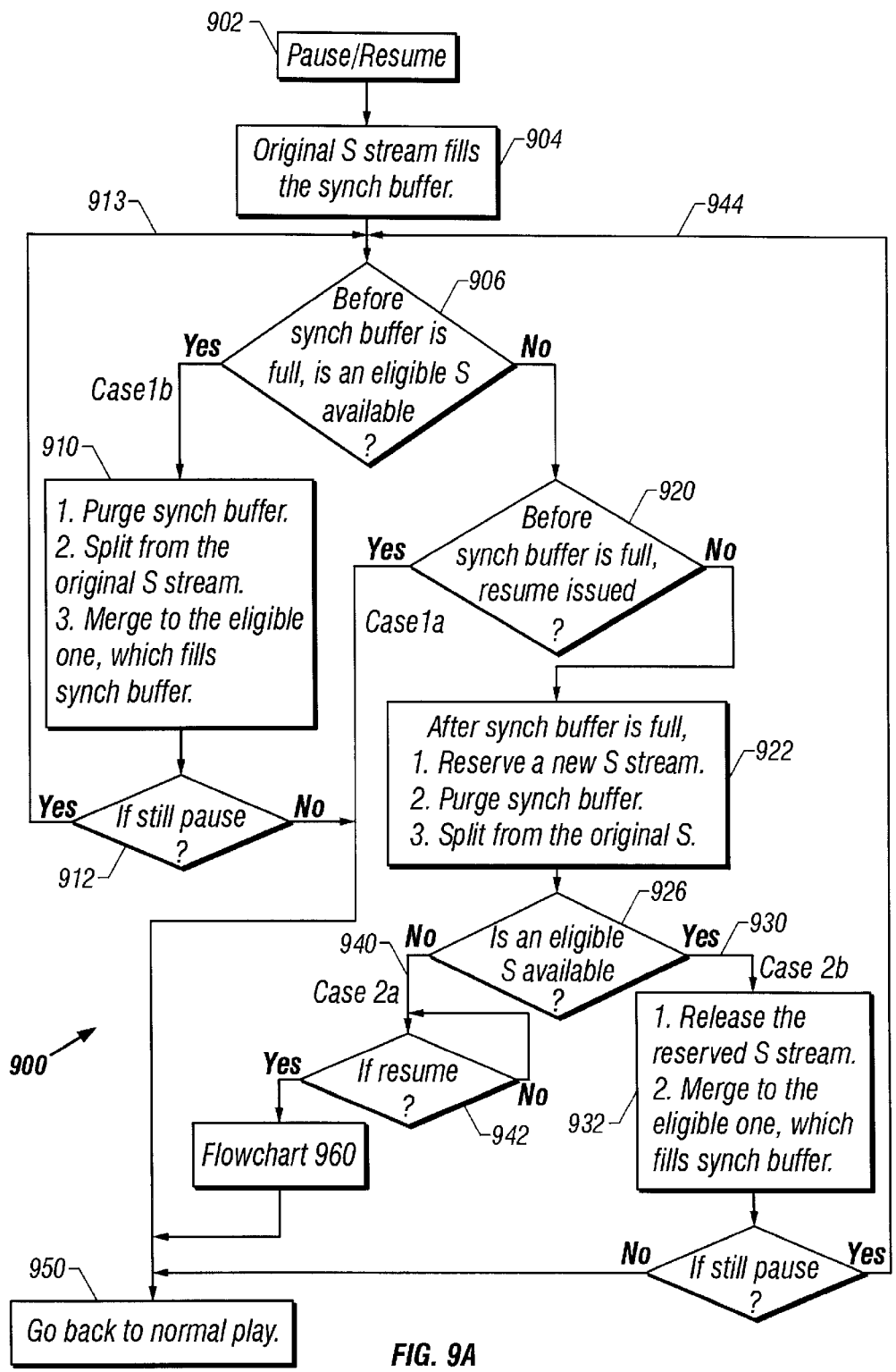
FIGS. 9A and 9B are flowcharts for the preferred operation of pause and resume in the SAM technology in accordance with the present invention.
Figure 9B:
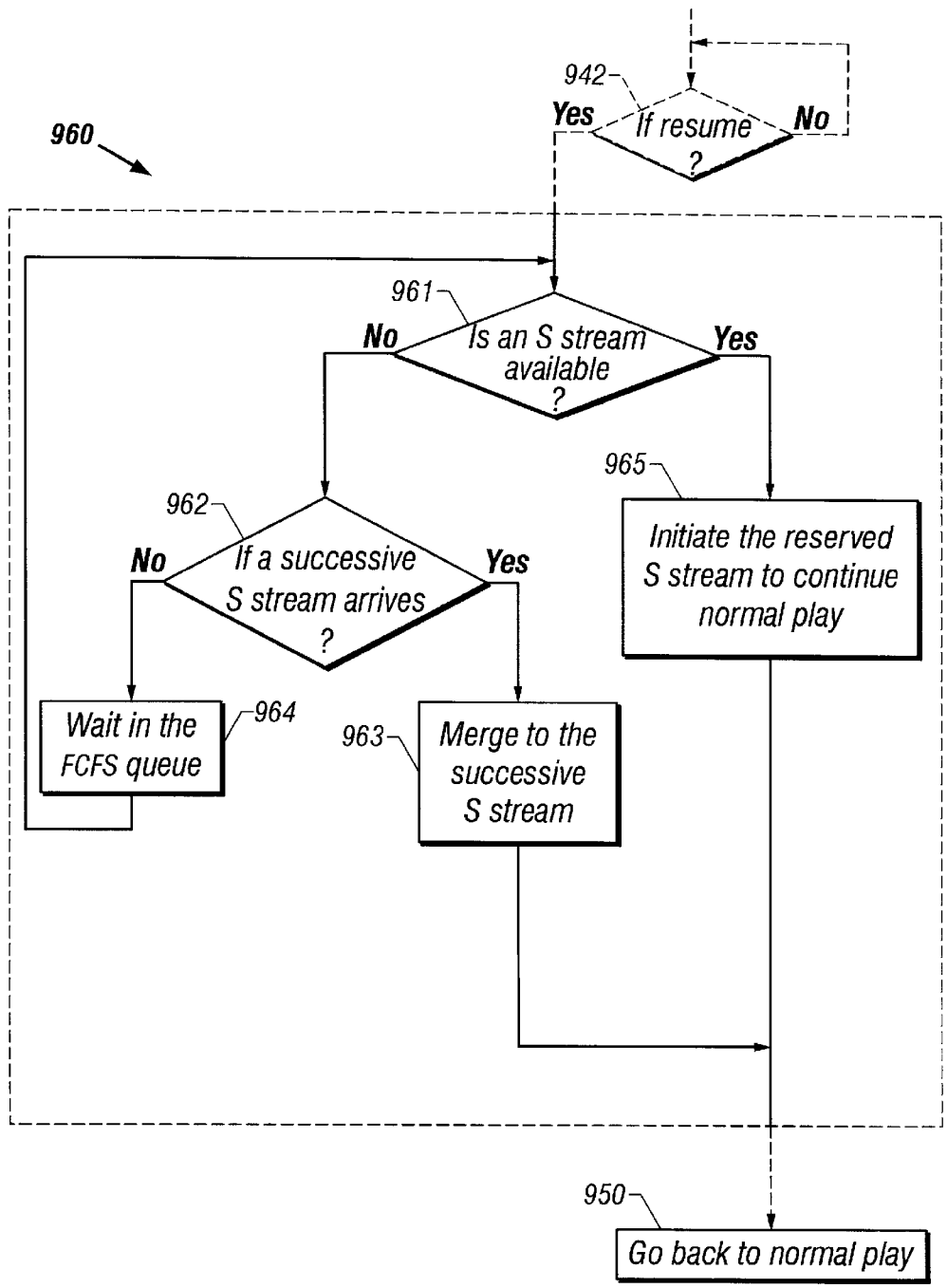

In a preferred embodiment described below, the SAM protocol performing pause and resume is shown in flowchart 900 in FIG. 9A and flowchart 960 in FIG. 9B. Again, each user is allocated a synch buffer of maximum size SB, which is assumed to correspond to four segments in the examples of FIG. 10 and FIG. 11.

(1) User Initially Served by Real Video Stream

Suppose the user accessing video i is being served an original S stream. As soon as the user issues the pause operation (step 902), a synch buffer is allocated to the user, and fed by the original S stream (step 904). After the pause operation, the only eligible S streams for merging must have started later than the original S stream.

If the synch buffer is not yet full and the successive S stream has not yet reached the corresponding play point when the user resumes normal play (Case 1a in FIG. 9A), SAM directs the user to retrieve the video from the synch buffer (steps 906, 920, and 950). An example is shown as Case 1a of FIG. 10A. The synch buffer includes segments 3 and 4 in this example when the user starts to retrieve video from it. This process does not incur any split and merge operation, but enables the original S stream (1002) along with the synch buffer to create a virtual stream for the interactive user.

If the synch buffer is not yet full and the user is still in the pause mode when the corresponding play point of the earliest of these eligible S streams (targeted S stream 1004 in FIG. 10A) is played (Case 1b in FIG. 9A), the user is split out from the original S stream and merged (switched) to the targeted ongoing S stream. In this case, SAM instructs the system to feed the synch buffer by the targeted S stream starting at the play point (steps 906 and 910). An example is shown as Case 1b of FIG. 10A, wherein the corresponding play point is the beginning of segment 3 in the targeted S stream 1004. Since the time offset is 3 segments, the corresponding play point will arrive after 3 segments of the original S stream 1002, namely, segments 3, 4, and 5, have been stored. When the user is merged to the targeted S stream 1004, segments 3, 4, and 5 are purged, and S stream 1004 feeds the synch buffer starting with segment 3. Since the user resumes when stream 1004 feeds the synch buffer the beginning of segment 4, only one segment's worth of the synch buffer is needed. In this example, the synch buffer contains segment 3 when the resume is issued. Therefore, this process minimizes the usage of the synch buffer.

If the buffer is filled before the pause terminates, a new S stream may have to be initiated, depending on whether the pause terminates before or after the eligible S stream has reached the play point (e.g., the start of segment 3 in FIG. 10D). As soon as the buffer is filled (step 922), a reservation request is made for a new S stream and the contents are purged from the synch buffer. In addition, the user is split from the original S stream. If the pause terminates before a successive S stream has reached the play point (Case 2a in FIG. 9A), SAM will determine if there is an S stream actually reserved for the user. If there is, the reserved S stream will be initiated to continue normal play for the user, starting from the play point. This is shown by steps 961 and 965 in FIG. 9B. If no S streams are available in the system, the user joins an FCFS queue to wait for the next available S stream (steps 962 and 964), or to wait until an ongoing successive S stream has reached the play point at which time the user can merge with this ongoing S stream (steps 962 and 963).

If the corresponding play point of the immediate successive S stream is played before the pause operation terminates (Case 2b in FIG. 9B), the reserved S stream is released, and the user is merged (switched) to the new stream and the synch buffer is now fed by the new stream, starting at the play point (step 932). For example, in Case 2b of FIG. 10D, the corresponding play point of the immediate successive S stream 1012 will be played before the pause operation terminates. Since the time offset is six segments, the corresponding play point will arrive after six segments of the original stream have arrived. Since the synch buffer for the user is limited to four segments, it can only store segments 3, 4, 5, and 6. When the synch buffer is full, an available S stream is reserved and the synch buffer is emptied. When the beginning of segment 3 of targeted S stream 1012 is reached, SAM prompts stream 1012 to feed the synch buffer starting at the beginning of segment 3. The user resumes when stream 1012 feeds the synch buffer the beginning of segment 4. The effective time offset is one segment, and therefore, only one segment's worth of synch buffer is required in this example. Again, only segment 3 is contained when the resume is issued.

In Cases 1b and 2b, since the user is still in the pause mode after being switched to the immediate successive ongoing S stream, the above procedure has to be repeated, perhaps multiple times, until the user terminates the pause operation. These are indicated in the loops 913 and 944 in FIG. 9A.

(2) User Initially Served by Virtual Video Stream

Figure 11A:
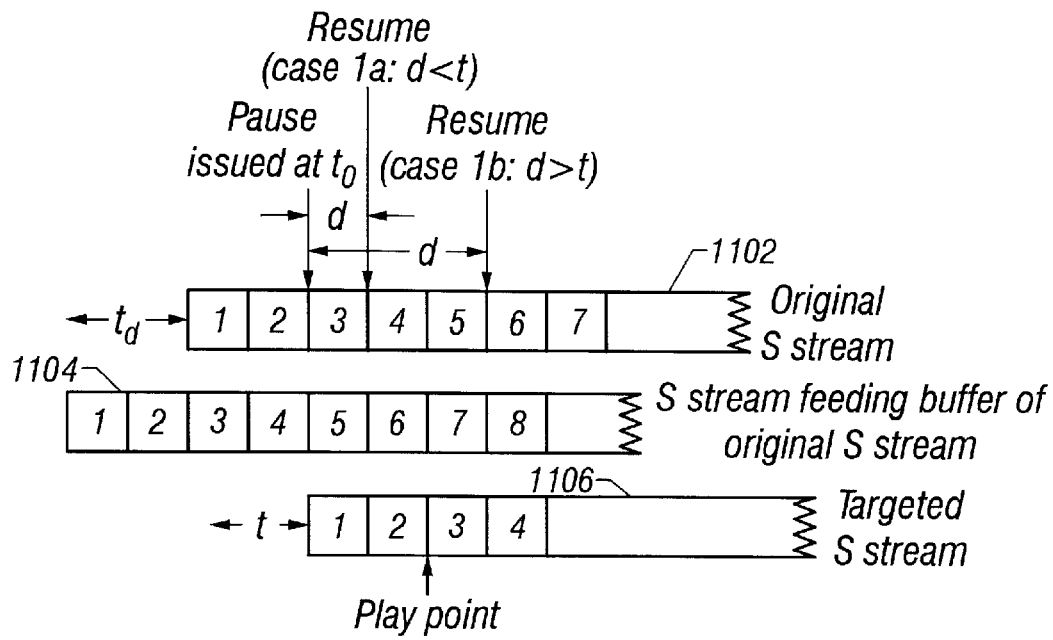
Figure 11B:
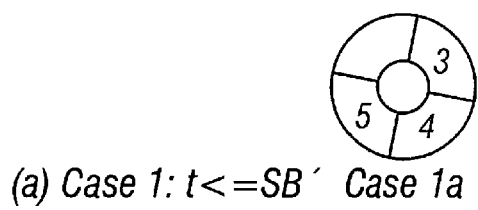
Figure 11C:
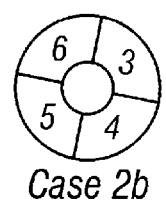

The above assumes that the user is fed by an S stream directly. The following describes the situation in which the user is being served by the synch buffer fed by an S stream, i.e., the user has issued an interactive operation earlier. FIG. 11 shows an example to illustrate how SAM handles pause and resume in this situation. Suppose the user accessing video i is being served by the ongoing virtual S stream 1102. Note that this virtual S stream is fed by an ongoing S stream 1104 which has started two segments earlier. In other words, two segments of the synch buffer have already been taken up in order to synchronize to this feeding S stream 1104, leaving only two segments available. This is the only difference between how SAM handles the pause operation when the user is fed directly, or via a synch buffer. Note that the synch buffer size is changed to $$SB'=SB-t_d,$$

where $t_d$ is the lead time of the feeding S stream 1104 compared to the original virtual S stream 1102. In addition, t, the delay time of the immediate successive ongoing S stream 1106, is calculated from the original virtual S stream 1102, not the feeding 1104 stream. In this example, $t_d$ is 2, SB' corresponds to two segments, and the delay time t corresponds to two segments.

The operation is described by the same flowchart 900 as when the user is fed by a real S stream. The synch buffer in this example should be SB' instead of SB. In addition, once a user is switched to a new stream (cases 1b and 2b), the user can discard the existing contents in the synch buffer, effectively augmenting his synch buffer to the maximum value of SB again.

Other user interactions may also be implemented. For example, a slow motion can be served by splitting the user from an initial S stream to an I stream. The I stream which is temporarily assigned to the user is played at a desired speed slower than the normal play speed. If the user stops the slow motion and resumes normal play, the SAM merges the user into an eligible S stream or is served by a new S stream in a similar manner to that described above.

Modifications of Preferred Embodiment

Although the present invention has been described in detail with reference to a preferred embodiment, one ordinarily skilled in the art to which this invention pertains will appreciate that various modifications and enhancements may be made in the described embodiments.

For example, the VOD system described herein specifically refers to video systems. However, other information sequences can be used, including but not limited to, a combination of video, audio segments, and discrete media such as text, tables, and still images.

Moreover, many variations of the basic SAM protocol are possible. Some examples are listed as follows.

(1) Avoiding the initial batching delay: As soon as a video request is received, SAM can attempt to determine if there are eligible S streams that start less than SB earlier. If there is, the system serves this request with an I stream in the normal play mode while feeding the synch buffer with an eligible on-going S stream for an interval equal to the offset. After the offset, SAM merges the user into the on-going stream for this video; otherwise, SAM initiates a new S stream to serve this request.

(2) Adjustable batching intervals: Batching intervals may be assigned different values for different videos. More popular programs can be assigned a shorter batching interval. In addition, since the popularity of a particular program may change over time, SAM can periodically (e.g., every two hours) change the batching interval, based on observed video request rate in the previous period.

(3) A variation of basic batching mode: SAM can divide time into fixed length intervals (e.g., every five minutes) rather than initiating a timer when the first request in a batch arrives. If at least one request for video i arrives during an interval, an S stream is initiated at the end of that interval. This has the advantage that, for unpopular videos, the average wait is equal to half of the batching interval, instead of the batching interval. There will not be much difference for popular ones.

(4) A synch buffer may have one input stream, but multiple output streams, serving different users with different time offsets. This saves buffering. One way to implement this is to employ a set of pointers pointing to different buffer locations. One of the pointers points to the present input location and other pointers point to different output locations with different time offsets.

(5) A service priority mechanism can be implemented in the SAM protocol to control the amount of user interactivity and other parameters of the VOD services. For example, pricing can be a user parameter to determine the level of the service. The more the user is willing to pay, the closer that user gets to true VOD service. At the high end, a user is served without initial batching delay and full user interactivity is allowed. At a median level, a user is served with full interactivity and initial batching delay. Finally, for the least cost, a user is served with initial batching delay and limited interactivity.

These and other modifications and enhancements are intended to be encompassed by the following claims.

What is claimed is:

1. A method for providing video-on-demand services to a plurality of users accessing a video through a channel, comprising:

generating a plurality of service streams, each indicative of the video;

multicasting said service streams to the plurality of users in batches to allow a number of the users to retrieve the video in a single batch;

generating one or more interaction video streams each indicative the video, each being designated to serve a single user for executing an interactive command;

allowing any one of the users in said single batch to execute an interactive command which requires a different viewing than what will be viewed by other users in said single batch who have not executed said interactive command and splitting said one user from said other users by connecting said one user to an interaction video stream to be an interactive user to allow for execution of said interactive command; and after completion of said interactive command, merging said one user to a service stream with one of said plurality of batches.

2. A method as in claim 1, wherein each of said batches includes at least one of said users and said multicasting comprises:

assigning a new request for said video from said users to an available batch;

continuing to assign additional requests for said video to said available batch until the end of the batching interval;

initiating a new video stream to serve said batch;

determining whether a new video stream is available when there is no batch available for said video;

rejecting a request for said video when a new video stream for said video is not available in said system resources; and initiating a new batch for said video when a new video stream for said video is available and serving requests in said new batch with said new video stream in normal play at the end of the batching interval.

3. A method as in claim 1, wherein said interactive command includes a command of one of operations comprising random access to any point in said video, and VCR-like operations which include fast forward, rewind, slow motion, and pause/resume operations.

4. A method as in claim 1, further comprising:
providing a synch buffer having a memory element that is connected to said channel and shared by said users, said synch buffer being operable to receive data from an ongoing video stream and to generate one or more virtual video streams which are delayed in time by different amounts with respect to said ongoing video stream, said synch buffer facilitating the merging of said interactive user with one of said batches.

5. A method as in claim 1, further comprising: adjusting a batching interval for a batch based on a rate of requests for a video.

6. A method as in claim 1, wherein said interactive command is an executing of random access to a play point in said video which comprises:
determining an availability of an eligible service stream which has a desired time offset with respect to said play point;
performing a first operation and searching for a new service stream when said eligible service stream is not available; and
performing a second operation and searching for an interaction stream when said eligible service stream is available.

7. A method as in claim 6, wherein said first operation comprises:
determining whether said new service stream is available;
continuing normal play in said original video stream for said interactive user and said searching for said eligible service stream when said new service stream is not available; and
initiating said new service stream to serve said interactive user beginning at said play point in normal play by first splitting said interactive user from said original video stream when said new service stream is available, thereby completing said user interaction.

8. A method as in claim 6, wherein said second operation comprises:
continuing normal play for said interactive user in said original video stream when said interaction stream is not available;
continuing said searching for said interaction stream until said interaction steam is available during a period in which said eligible service stream remains eligible; and
beginning a new search for another eligible service stream when said eligible service stream becomes ineligible.

9. A method as in claim 6, wherein said second operation comprises:
splitting said interactive user from said original video stream and assigning said interactive user with a buffer space in said synch buffer when said interaction stream is available;
serving said interactive user with said interaction stream in normal play during a period equal to said time offset while simultaneously beginning to fill said synch buffer from said eligible service stream upon said splitting; and
releasing said interaction stream for another interactive request at the end of said time offset while simultaneously merging said interactive user to said eligible service stream at said play point by connecting said user to said synch buffer.

10. A method as in claim 6, wherein said desired time offset is less than a play duration in normal play for a maximum amount of data allowed in said synch buffer for said interactive user.

11. A method as in claim 1, wherein a user interaction of said fast forward or rewind to a play point in said video comprises:
determining an availability of an interaction stream;
continuing to serve said interactive user in normal play from the original video stream that serves said interactive user when said user interaction is requested if an interaction stream is not available;
splitting said interactive user from said original video stream when said interaction stream is available and serving said interactive user with said interaction stream for performing said user interaction until said play point is reached; and
subsequently changing said interaction stream into a normal play mode to continue serving said interactive user and performing a merge operation to switch said interactive user from said interaction stream into a service stream for continuing normal play.

12. A method as in claim 11, wherein said merge operation comprises:
searching for an eligible service stream which has a desired time offset with respect to a data point to which said original video stream reaches when said user interaction is completed;
assigning said interactive user with a space in said synch buffer when said eligible service stream is available and filling said synch buffer with said eligible service stream for a duration equal to said time offset at the end of which said interaction stream is released for another interactive request and said interactive user is merged to said eligible service stream by connecting said interactive user to said synch buffer; and
searching for a new service stream when said eligible service is not available until said new service stream is found and assigned to said interactive user, at which time said interaction stream is released and said interactive user is merged to said new service stream in normal play.

13. A method as in claim 12, wherein said desired time offset is less than a play duration in normal play for a maximum amount of data allowed in said synch buffer for said interactive user.

14. A method as in claim 1, wherein said interactive command is a pause and resume operation for a pause duration which comprises:
stopping normal play at a play point for said interactive user in the original video stream that serves said interactive user when said pause is initiated;
assigning said interactive user a space in said synch buffer and feeding said synch buffer with said original video stream beginning at said play point upon initiation of said pause;
performing a first operation before said synch buffer is filled and none of eligible service streams has yet to reach said play point when said pause is terminated, said first operation resuming normal play for said interactive user at said play point by connecting said interactive user to said synch buffer;
performing a second operation before said synch buffer is filled and one of said eligible service streams reaches said play point as said pause continues, said second operation including purging said synch buffer, simultaneously feeding said synch buffer from said eligible service stream beginning at said play point by connecting said user to said eligible service stream, switching said interactive user to a subsequent eligible service stream during said pause, at which time said interactive user is merged to said eligible service stream which is feeding emptied said synch buffer from said play point; and performing a third operation when said interactive user remains in said pause and said synch buffer is filled.

15. A method as in claim 14, wherein said third operation comprises:

purging said synch buffer;

reserving a new service stream;

determining the availability of an eligible ongoing service stream for said video;

switching to said eligible service stream when said eligible service stream is available by feeding said synch buffer from said eligible service stream starting from the said play point; and upon termination of the pause operation by the user, resuming normal play by using said reserved new service stream if said eligible ongoing service stream is not available.

16. A method as in claim 14, further comprising:

repeating said first operation, said second operation, or said third operation as said pause continues after switching to said eligible service stream;

performing said first operation before said synch buffer is filled and none of eligible service streams has yet to reach said play point when said pause is terminated;

performing said second operation before said synch buffer is filled and one of said eligible service streams reaches said play point as said pause continues; and performing said third operation when said interactive user remains in said pause and said synch buffer is filled.

17. A method as in claim 14, wherein said original video stream is an ongoing service stream.

18. A method as in claim 14, wherein said original video stream is a virtual video stream from said synch buffer and said assigning of said space in said synch buffer is accomplished by using a remaining space available to said interactive user in said synch buffer.

19. A method as in claim 14, wherein said eligible service stream has a time offset with respect to said original video stream that is the smallest comparing with other ongoing service streams that start later than said original stream.

20. A digital data distribution system, comprising:

an information channel which transports digital data and communication signals;

a plurality of data receivers connected to said information channel and configured to communicate with said information channel;

at least one digital server connected to said information channel, having a digital data storage device which stores information, said server operating to produce a plurality of data streams indicative of said stored information and multicast said stored information over said information channel to said receivers;

a synchronization buffer memory device connected to receive said data streams from said server and connectable to feed said data receivers, said synchronization buffer memory device operable to duplicate a received data stream into one or more delayed data streams that are delayed in time by different amounts with respect to said received data stream; and an electronic controller connected to said information channel to select a data stream from said server and from a delayed data stream generated by said synchronization buffer memory device to feed a data receiver according to a user's request, said electronic controller operating to control said multicasting by said server such that a number of said receivers receive said stored information in a batch assigned with one of said data streams and to control said multicasting using a split-and-merge protocol in which a data receiver requesting an interactive command is split from said batch and merged into another batch upon completion of said interactive command.

21. A system as in claim 20, wherein said synchronization buffer memory device has connections to different data receivers to allow for accessing data stored in said synchronization buffer memory device at different points by said different data receivers to retrieve delayed data streams in response to users' activities.

22. A system as in claim 20, said electronic controller comprises:

means for controlling initiation of batches according to a batch protocol, wherein each of said batches has at least one request from said receivers;

means for controlling said server and said network to multicast said video streams to said data receivers according to said batch protocol;

means for executing a plurality of user interactions requested by said data receivers in a true video-on-demand manner while achieving a maximum sharing of a video stream in a batch, said user interactions including random access to any point in said video, and VCR-like operations which include fast forward, rewind, slow motion, and pause/resume; and means for performing said split-and-merge protocol in combination of said synch buffer to provide true video-on-demand services.

23. A system as in claim 20, further comprising:

means for partitioning said data streams available for said information into a first number of service streams for multicast in normal play and a second number of interaction streams for serving an interactive request during said executing of said interactions, said partitioning designed to reduce delay time of said video-on-demand services and to increase sharing of said data streams.

24. A system as in claim 22, wherein said electronic controller includes an execution means for carrying out said batch protocol, said execution means comprising:

means for assigning a new request for said information from said data receivers to an available batch;

means for continuing to assign additional requests for said information to said available batch until pre-selected batching interval expires, at which time a new data stream is initiated for said batch;

means for determining whether a new data stream is available when there is no batch available for said information;

means for rejecting a request for said information when a new data stream for said information is not available; and means for initiating a new batch for said information when a new data stream for said information is available and serving requests in said new batch with said new data stream after initial batching interval expires.

25. A system as in claim 22, wherein said electronic controller includes an execution means for carrying out said batch protocol, said execution means comprising:

means for determining whether an eligible service stream is available for a new request for said information from said data receivers;

means for merging said new request to said eligible service stream immediately when one of said eligible service streams is available for said information;

means for determining whether a new data stream is available when there is no said eligible service stream available for said information; and means for rejecting a request for said information when a new data stream for said information is not available.

26. A system as in claim 22, wherein said electronic controller includes an execution means for carrying out said batch protocol, said execution means comprising:

means for assigning a new request for said information from said data receivers to an available batch;

means for continuing to assign additional requests for said information to said available batch until rate-varying batching interval expires, at which time a new data stream is initiated for said batch;

means for varying a batching interval from batch to batch based on a rate of request for said video from said users to increase sharing of a video stream in each of said batches and to reduce waiting time for serving each request from said users;

means for decreasing said batching interval as said rate of request for said video increases according to a batching criterion;

means for increasing said batching interval as said rate of request for said video decreases according to a batching criterion;

means for determining whether a new data stream is available when there is no batch available for said information;

means for rejecting a request for said information when a new data stream for said information is not available; and means for initiating a new batch for said information when a new data stream for said information is available and serving requests in said new batch with said new data stream after initial batching interval expires.

27. A system as in claim 20, wherein said electronic controller includes an execution means for carrying out said batch protocol, said execution means comprising:

means for assigning a new request for said information from said data receivers to an available batch;

means for continuing to assign additional requests for said information to said available batch until fixed-time-slot batching interval expires, at which time a new data stream is initiated for said batch;

means for partitioning time into a set of time slots with equal length interval, initiating a new data stream only when at least one new request arrives in time slot;

means for determining whether a new data stream is available when there is no batch available for said information;

means for rejecting a request for said information when a new data stream for said information is not available; and means for initiating a new batch for said information when a new data stream for said information is available and serving requests in said new batch with said new data stream after initial batching interval expires.

28. A system as in claim 20, wherein said split-and-merge protocol includes merging said interactive user into a real data stream from said server or a delayed data stream from said synchronization buffer memory device.

29. A system as in claim 20, wherein said synchronization buffer memory device has one input terminal operable to receive data from a feeding data stream and a plurality of output terminals operable to generate said delayed data streams.

* * * * *